(12) United States Patent
Wang

(10) Patent No.: US 8,446,122 B2
(45) Date of Patent: May 21, 2013

(54) ELECTRONIC DEVICE AND CHARGEABLE KEYBOARD WITH SOLAR CELLS LOCATED ON A KEYBOARD

(75) Inventor: Yi-Chen Wang, Taoyuan (TW)

(73) Assignee: Darfon Electronics Corp., Gueishan, Taoyuan (TW)

( * ) Notice: Subject to any disclaimer, the term of this patent is extended or adjusted under 35 U.S.C. 154(b) by 360 days.

(21) Appl. No.: 12/986,166

(22) Filed: Jan. 6, 2011

(65) Prior Publication Data

US 2011/0169444 A1 Jul. 14, 2011

(30) Foreign Application Priority Data

Jan. 8, 2010 (TW) .............................. 99200334 U

(51) Int. Cl.
*H01M 10/46* (2006.01)
(52) U.S. Cl.
USPC .......................................... 320/101

(58) Field of Classification Search
USPC .......... 320/101, 103, 107, 114, 115; 136/244, 136/245, 291, 293
See application file for complete search history.

(56) References Cited

U.S. PATENT DOCUMENTS

| | | | | |
|---|---|---|---|---|
| 5,911,529 A | * | 6/1999 | Crisan | 400/472 |
| 2011/0298718 A1 | * | 12/2011 | Chang et al. | 345/168 |
| 2012/0146915 A1 | * | 6/2012 | Chen | 345/169 |

FOREIGN PATENT DOCUMENTS

| | | |
|---|---|---|
| TW | 562185 | 11/2003 |
| TW | M287469 | 2/2006 |

* cited by examiner

*Primary Examiner* — Edward Tso
(74) *Attorney, Agent, or Firm* — Winston Hsu; Scott Margo

(57) ABSTRACT

An electronic device includes a keyboard including a component, a light energy collection module disposed on a surface of the component of the keyboard for collecting light energy from an external light source, and a photoelectric module coupled to the light energy collection module for receiving the light energy from the light energy collection module and converting the light energy into electrical energy.

10 Claims, 6 Drawing Sheets

ELECTRONIC DEVICE AND CHARGEABLE KEYBOARD WITH SOLAR CELLS LOCATED ON A KEYBOARD

BACKGROUND OF THE INVENTION

1. Field of the Invention

The invention relates to a keyboard, and more particularly, to a keyboard capable of converting light energy into electrical energy by disposing solar panels on a surface of a component of the keyboard and capable of storing the electrical energy in the battery.

2. Description of the Prior Art

Recently, since modern technology trends to small size and light weight, a notebook computer has been more and more popular in computer industry and become the tide to replace a desktop computer. Accordingly, people skilled in the art all investigate a lot in developing a more powerful notebook computer for gaining profits in the market.

However, a conventional product development tends to improve the appearance of the notebook computer or to add a multi-media function for the notebook computer and seldom provides improvement in increasing working hours of a battery implemented in the notebook computer. An average working hour of the battery for the conventional notebook computer is approximately two to fours hours or so. The main difference of the working hours depends on capacity of the battery and power consumption of the notebook computer. A user often needs to bring a backup battery for enhancing the working hours of the notebook computer or to bring an AC/DC inverter for the notebook computer to be charged from an external AC source.

In practical application, whether adopting the former or the latter way to enhance the working hours of the notebook computer, it needs the user to bring the additional backup battery or the AC/DC inverter. Accordingly, the aforesaid ways both result in inconvenience for the user. Moreover, when the notebook computer is in use, the important data in process may not be stored in time due to running out of the battery if the battery is not charged in the process. Accordingly, it may be in a risk of losing the important data so as to cause a great loss for the user.

In addition, with the development of technology, a data processing device is becoming more and more popular. For example of a computer device, no matter a conventional desktop computer or a portable notebook computer with small and thin size still needs to be equipped with a keyboard for the user to perform operation of character input and so on. However, the keyboard commonly implemented in the notebook computer in the market is not equipped with a charging function. Accordingly, the working hours of the notebook computer still can not be greatly enhanced.

SUMMARY OF THE INVENTION

The present invention provides an electronic device and a chargeable keyboard for solving above drawbacks.

According to the claimed invention, an electronic device includes a keyboard including a component, a light energy collection module disposed on a surface of the component of the keyboard for collecting light energy from an external light source and a photoelectric module coupled to the light energy collection module for receiving the light energy from the light energy collection module and converting the light energy into electrical energy.

According to the claimed invention, the electronic device further includes a battery and a charging module coupled to the photoelectric module and the battery for charging the battery.

According to the claimed invention, the charging module charges the battery when the electronic device is in a low power consuming or turned-off status.

According to the claimed invention, the electronic device is a notebook computer.

According to the claimed invention, the component is a key cap of a keyswitch of the keyboard.

According to the claimed invention, the component is a decorating strip of the keyboard.

According to the claimed invention, the component is a frame of the keyboard.

According to the claimed invention, the light energy collection module comprises a plurality of solar panels for collecting solar energy.

According to the claimed invention, the plurality of solar panels comprises a P-typed semiconductor and an N-typed semiconductor.

According to the claimed invention, the external light source is the sun or a fluorescent lamp.

According to the claimed invention, a chargeable keyboard includes a main body including a component, a battery disposed on the main body, a light energy collection module disposed on a surface of the component for collecting light energy from an external light source, a photoelectric module coupled to the light energy collection module for receiving the light energy from the light energy collection module and converting the light energy into electrical energy and a charging module coupled to the photoelectric module and the battery for charging the battery.

In summary, the rechargeable keyboard and the electronic device (e.g. a notebook computer) using the same of the present invention utilize the plurality of solar panels disposed on the surface of any one of the components (e.g. the keycap, the decorating strip or the frame of the keyswitch) of the rechargeable keyboard, so as to collect the light energy efficiently and to convert the light energy into electrical energy stored in the battery. Accordingly, the working hours of the electronic device can be greatly enhanced and the user does not need to bring an additional backup battery or an AC/DC inverter for the battery to be charged. As a result, it causes a great convenience for the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
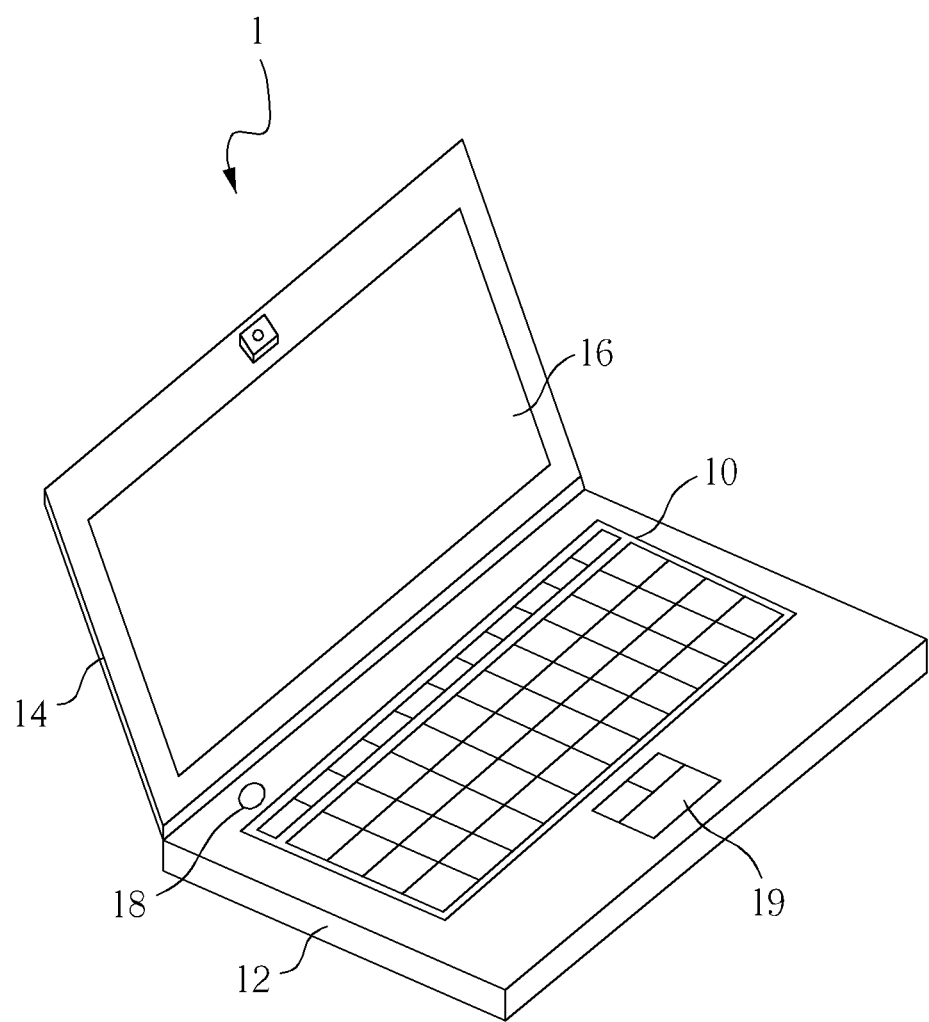
FIG. 1 is a schematic diagram of a notebook computer according to an embodiment of the present invention.

Please refer to FIG. 1. FIG. 1 is a schematic diagram of a notebook computer 1 according to an embodiment of the present invention. As shown in FIG. 1, the notebook computer 1 includes a rechargeable keyboard 10, a base 12, a cover 14, a display 16, a switch 18 and a touch control panel 19. In this embodiment, the notebook computer 1 can be, but not limited to, substituted for a data processing device. It should be noticed that the base 12, the cover 14, the display 16, the switch 18 and the touch control panel 19 are identical to those implemented in a conventional notebook computer. For simplicity, it is not depicted herein.

Figure 2:
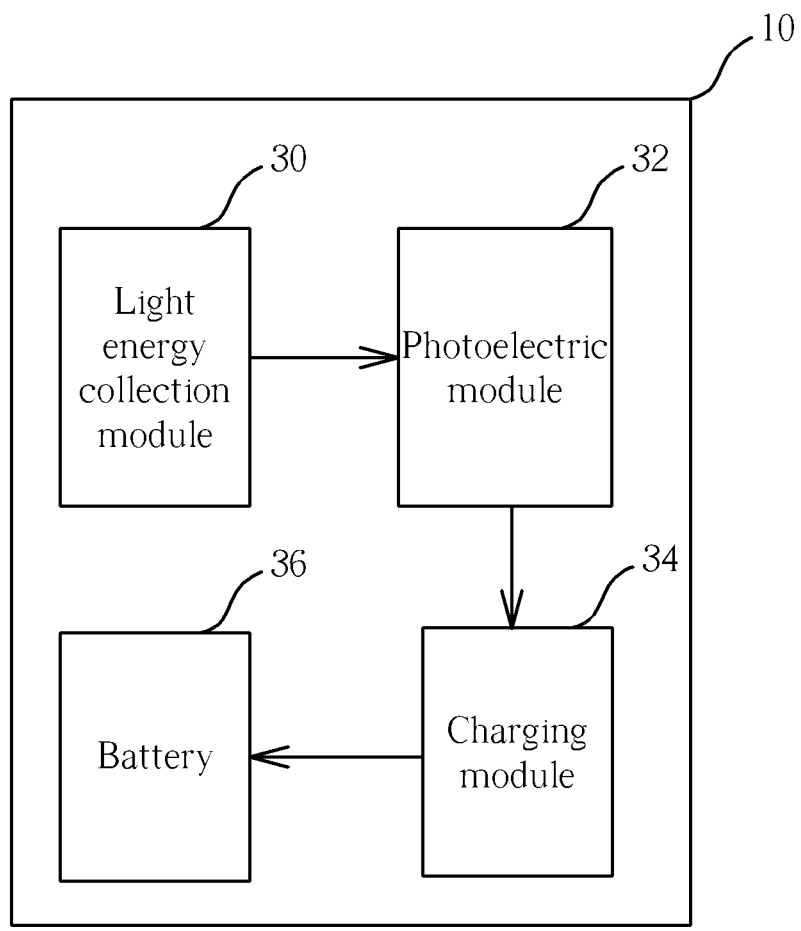
FIG. 2 is a functional block diagram of a rechargeable keyboard of the notebook computer according to the embodiment of the present invention.

More detailed description for the rechargeable keyboard 10 of the notebook computer 1 is provided as follows. Please refer to FIG. 2. FIG. 2 is a functional block diagram of the rechargeable keyboard 10 of the notebook computer 1 according to the embodiment of the present invention. As shown in FIG. 2, the rechargeable keyboard 10 of the notebook computer 1 includes a light energy collection module 30, a photoelectric module 32, a charging module 34 and a battery 36. The light energy collection module 30 is coupled to the photoelectric module 32, the photoelectric module 32 is coupled to the charging module 34, and the charging module 34 is coupled to the battery 36.

In this embodiment, the light energy collection module 30 is used for collecting light energy from an external light source. The photoelectric module 32 is used for receiving the light energy from the light energy collection module 30 and converting the light energy into electrical energy. The charging module 34 is used for charging the battery 36 with the electrical energy converted by the photoelectric module 32. In practical application, the photoelectric module 32, the charging module 34 and the battery 36 do not limit to a specific type, and selection for those above-mentioned components depends on practical demands.

Figure 3:
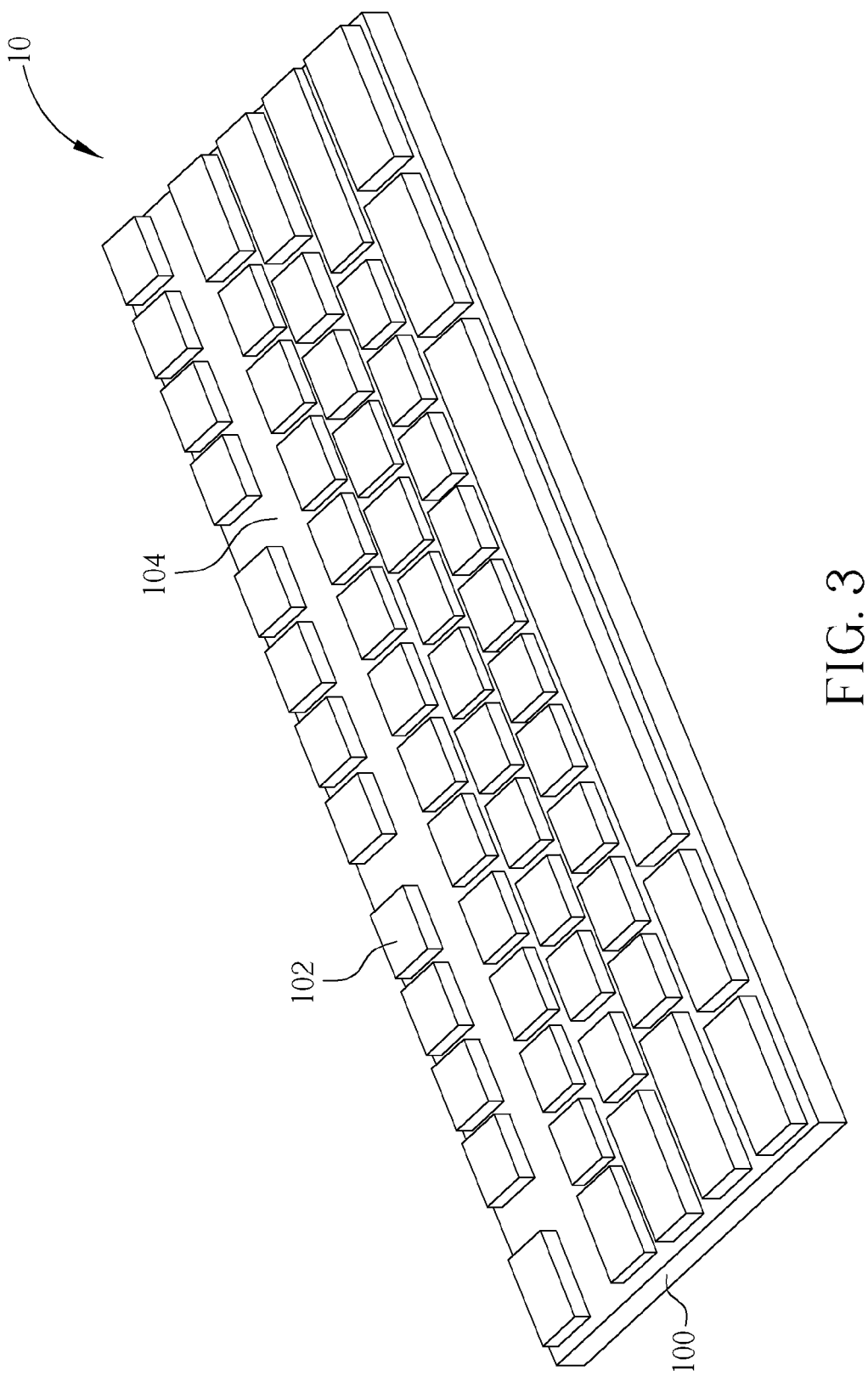
FIG. 3 is a schematic diagram of the rechargeable keyboard in FIG. 1.
Figure 4:
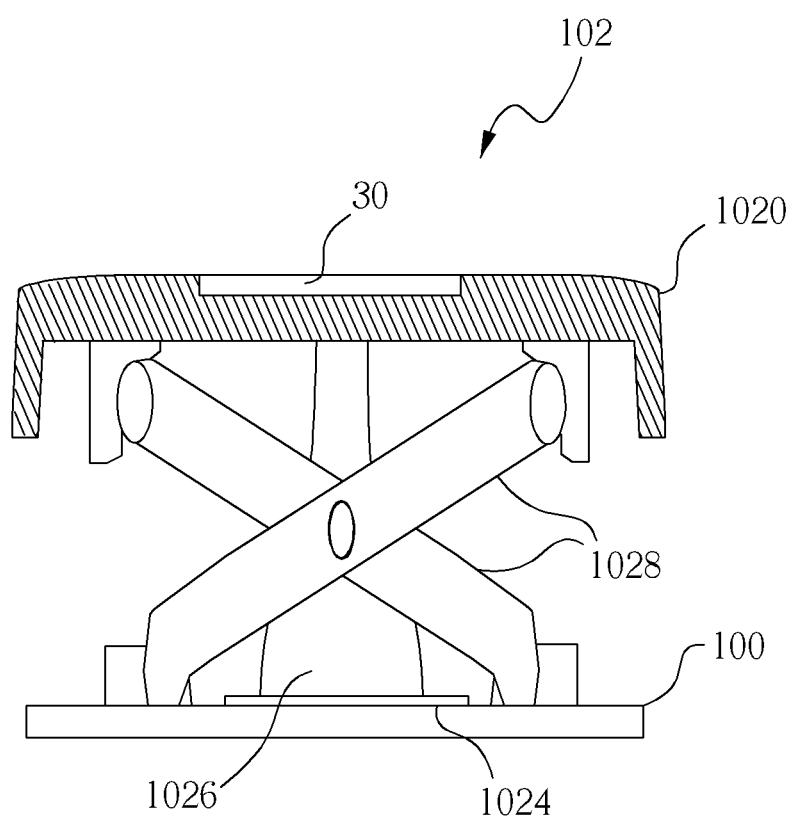
FIG. 4 is a structural diagram of a keyswtich in FIG. 3.

Please refer to FIG. 3. FIG. 3 is a schematic diagram of the rechargeable keyboard 10 shown in FIG. 1. As shown in FIG. 3, the rechargeable keyboard 10 includes a main body 100, a plurality of keyswitches 102 and a decorating strip 104. The keyswtich 102 and the decorating strip 104 are components disposed on the main body 100. Please refer to FIG. 4. FIG. 4 is a structural diagram of the keyswtich 102 shown in FIG. 3. As shown in FIG. 4, the keyswtich 102 includes a key cap 1020, the light energy collection module 30, a flexible circuit board 1024, a rubber dome 1026 and a plunger 1028. It should be noticed that the structure of a keyswitch is not limited to one of the keyswitch 102 in FIG. 4. That is, it can be other type of structures in the prior art and depend on practical demands.

In this embodiment, when the keyswitch 102 is pressed, the key cap 1020 will move downwards so that the rubber dome 1026 is deformed. As a result, a contact end (not shown) inside the rubber dome 1026 contacts with a switch on the flexible circuit board 1024 so as to activate the switch. In practical application, input function of characters or other similar input functions can be achieved by the contact of the switch on the flexible circuit board 1024 and the contact end inside the rubber dome 1026. Furthermore, the plunger 1028 as a supporting component is disposed between the key cap 1020 and the main body 100, and the plunger 1028 connects the key cap 1020 and the main body 100 so as to make the key cap 1020 be capable of moving upwards and downwards relative to the main body 100. Accordingly, when the keyswitch 102 is not pressed, the plunger 1028 makes the keyswitch 102 move back to an un-pressed position rapidly. It should be noticed that operation of the keyswitch 102 of the rechargeable keyboard 10 is not depicted herein since it is known in the conventional keyswitch.

It should be noticed that the light energy collection module 30 of the rechargeable keyboard 10 can include, but not limited to, a plurality of solar panels, that is, it can include other components capable of collecting light energy from an external light source. In this embodiment, the light energy collection module 30 is disposed on the components on the main body 100 of the rechargeable keyboard 10. For example, the light energy collection module 30 can be disposed on the surface of the key cap 1020 of the keyswitch 102 for collecting the light energy of the external light source, as shown in FIG. 4. In practical application, the amount of the solar panels of the light energy collection module 30 and the positions where the solar panels are disposed are not limited and depend on practical demands.

Figure 5:
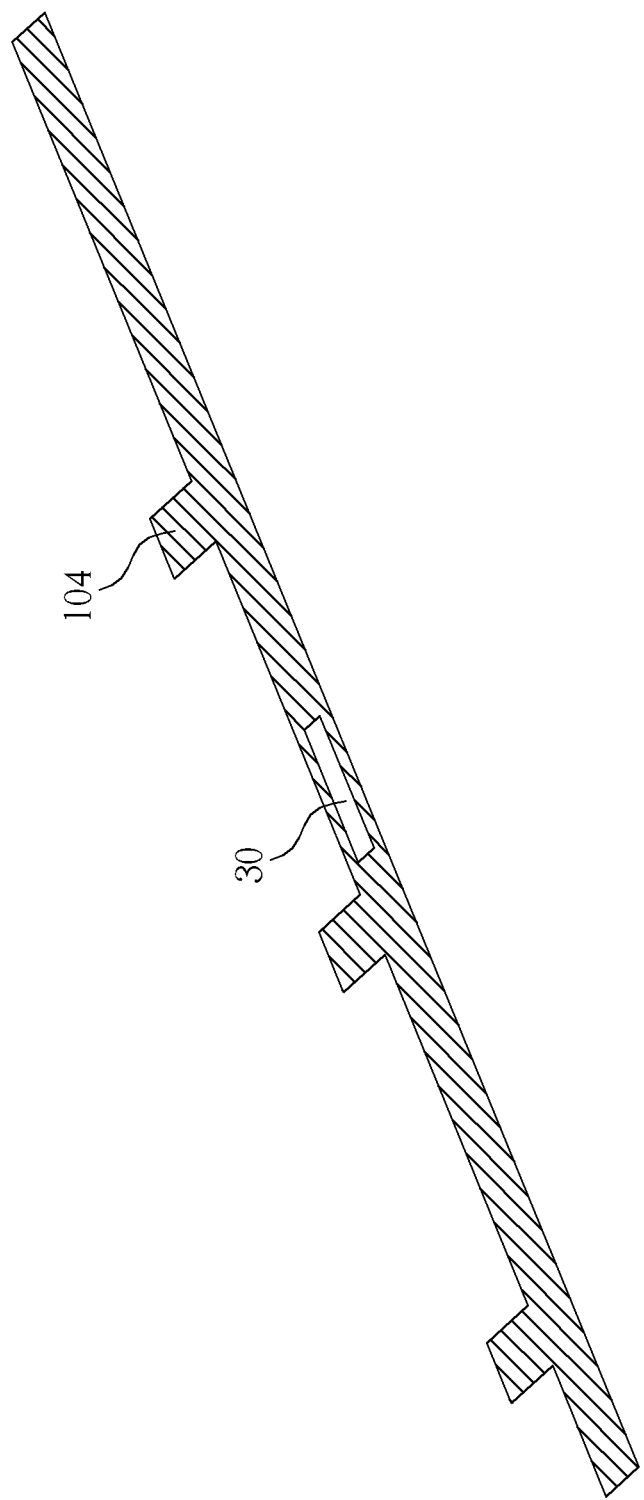
FIG. 5 is a structural diagram of a decorating strip of the rechargeable keyboard in FIG. 3.

Furthermore, please refer to FIG. 5. FIG. 5 is a structural diagram of the decorating strip 104 of the rechargeable keyboard 10 in FIG. 3. As shown in FIG. 5, the light energy collection module 30 can be, but not limited to, disposed on the decorating strip 104 of the rechargeable keyboard 10. In practical application, the amount of the solar panels and the positions where the solar panels are disposed are not limited and depends on practical demands.

Figure 6:
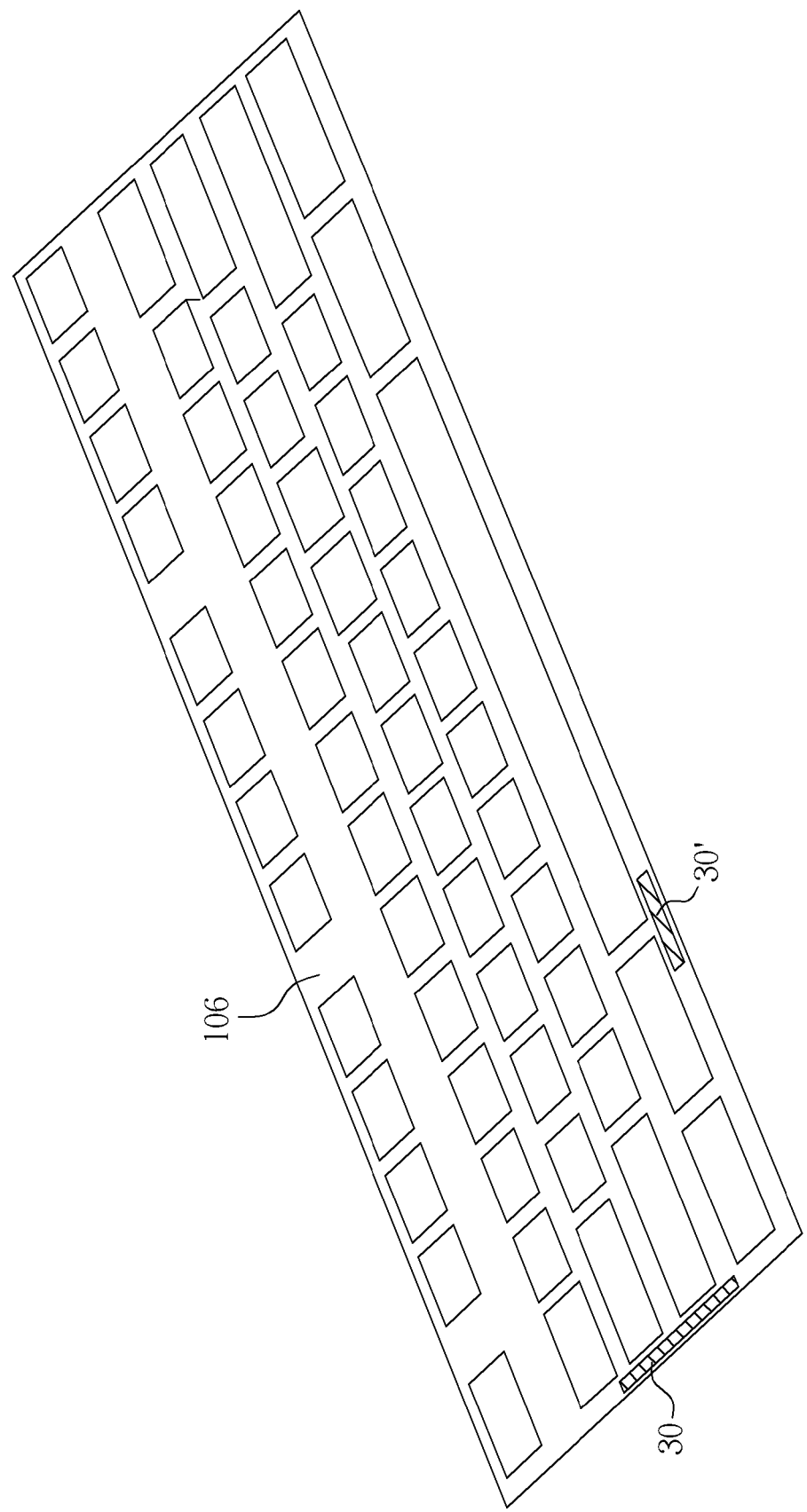
FIG. 6 is a diagram of a light energy collection module being disposed on a frame.

In addition, besides the above-mentioned keyswitch 102 and decorating strip 104 of the rechargeable keyboard 10, the light energy collection module 30 can be disposed on a frame of the rechargeable keyboard 10. For example, please refer to FIG. 6, which is a diagram of the light energy collection module being disposed on a frame 106. As shown in FIG. 6, the light energy collection modules 30 and 30' are disposed on the frame 106 of the rechargeable keyboard 10. In practical application, the amount of the solar panels of the light energy collection modules 30 and 30' and the positions where the solar panels are disposed are not limited and depends on practical demands.

In practical application, the above mentioned solar panels of the light energy collection module can include, but not limited to, a P-typed semiconductor and an N-typed semiconductor. The external light source can be, but not limited to, the sun or a fluorescent lamp. In practical application, the charging module 34 of the rechargeable keyboard 10 charges the battery 36 when the notebook computer 1 is in a low power consuming or turned-off status. Accordingly, the working hours of the notebook computer 1 can be greatly enhanced and the user does not need to bring an additional backup battery or an AC/DC inverter for the battery to be charged. As a result, it causes a great convenience for the user.

A rechargeable keyboard is illustrated in the following according to another embodiment of the present invention. In this embodiment, the rechargeable keyboard is implemented in an electronic device. The rechargeable keyboard includes a main body including a component, a battery, a light collection module, a photoelectric module and a charging module. The battery is disposed on the main body. The light energy collection module disposed on a surface of the component for collecting light energy from an external light source. The photoelectric module is coupled to the light energy collection module for receiving the light energy from the light energy collection module and converting the light energy into electrical energy. The charging module is coupled to the photoelectric module and the battery for charging the battery.

In practical application, the electronic device can be, but not limited to, a notebook computer. Furthermore, the component of the main body can be a key cap of one keyswitch disposed on the surface of the rechargeable keyboard, a decorating strip, a frame or any other components disposed on the surface of the rechargeable keyboard.

In this embodiment, the light energy collection module disposed on the surface of the component can include a plurality of solar panels for collecting solar energy. In addition, the plurality of solar panels can include, but not limited to, a P-typed semiconductor and an N-typed semiconductor. The external light source can be, but not limited to, the sun or a fluorescent lamp. In practical application, the charging module of the rechargeable keyboard charges the battery when the electronic device is in a low power consuming or turned-off status. As for more detailed description for structures and operations of the rechargeable keyboard in this embodiment, since it is identical to those mentioned in the previous embodiment, it is not depicted herein for simplicity.

Compared with the prior art, the rechargeable keyboard and the electronic device (e.g. a notebook computer) using the same of the present invention utilize the plurality of solar panels disposed on the surface of any one of the components (e.g. the keycap, the decorating strip or the frame of the keyswitch) of the rechargeable keyboard, so as to collect the light energy efficiently and to convert the light energy into electrical energy stored in the battery. Accordingly, the working hours of the electronic device can be greatly enhanced and the user does not need to bring an additional backup battery or an AC/DC inverter for the battery to be charged. As a result, it causes a great convenience for the user.

Those skilled in the art will readily observe that numerous modifications and alterations of the device and method may be made while retaining the teachings of the invention.

What is claimed is:

1. An electronic device, comprising:
   a keyboard comprising a component, the component being a key cap of a keyswitch of the keyboard;
   a light energy collection module disposed on a surface of the component of the keyboard for collecting light energy from an external light source;
   a photoelectric module coupled to the light energy collection module for receiving the light energy from the light energy collection module and converting the light energy into electrical energy;
   a battery; and
   a charging module coupled to the photoelectric module and the battery for charging the battery when the electronic device is in a low power consuming or turned-off status.

2. The electronic device of claim 1, being a notebook computer.

3. The electronic device of claim 1, wherein the light energy collection module comprises a plurality of solar panels for collecting solar energy.

4. The electronic device of claim 3, wherein the plurality of solar panels comprises a P-typed semiconductor and an N-typed semiconductor.

5. The electronic device of claim 1, wherein the external light source is the sun or a fluorescent lamp.

6. A chargeable keyboard implemented in an electronic device, the chargeable keyboard comprising:
   a main body comprising a component, the component being a key cap of a keyswitch;
   a battery disposed on the main body;
   a light energy collection module disposed on a surface of the component for collecting light energy from an external light source;
   a photoelectric module coupled to the light energy collection module for receiving the light energy from the light energy collection module and converting the light energy into electrical energy; and
   a charging module coupled to the photoelectric module and the battery for charging the battery when the electronic device is in a low power consumption state or in a turned-off state.

7. The chargeable keyboard of claim 6, wherein the electronic device is a notebook computer.

8. The chargeable keyboard of claim 6, wherein the light energy collection module comprises a plurality of solar panels for collecting solar energy.

9. The chargeable keyboard of claim 8, wherein the plurality of solar panels comprises a P-typed semiconductor and an N-typed semiconductor.

10. The chargeable keyboard of claim 6, wherein the external light source is the sun or a fluorescent lamp.

\* \* \* \* \*